I. NORMANDY.
AUTOMOBILE TIRE.
APPLICATION FILED OCT. 5, 1916.
1,231,931.
Patented July 3, 1917.
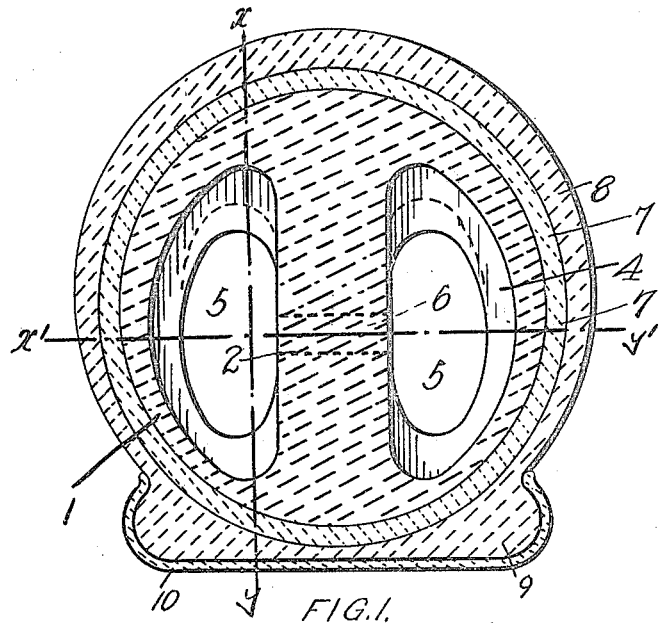
FIG.1.
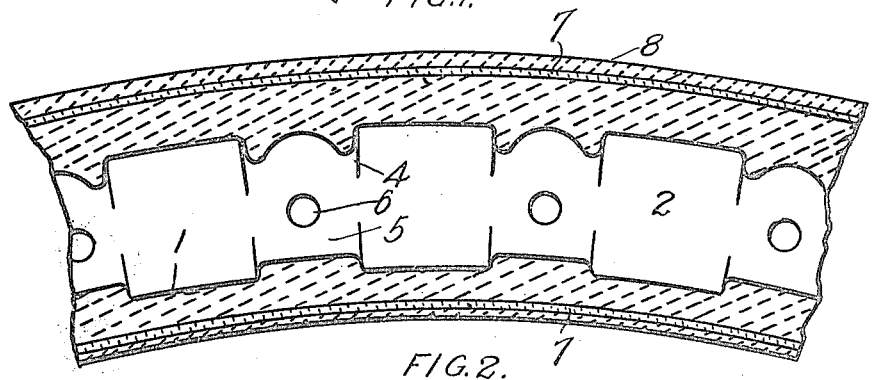
FIG.2.
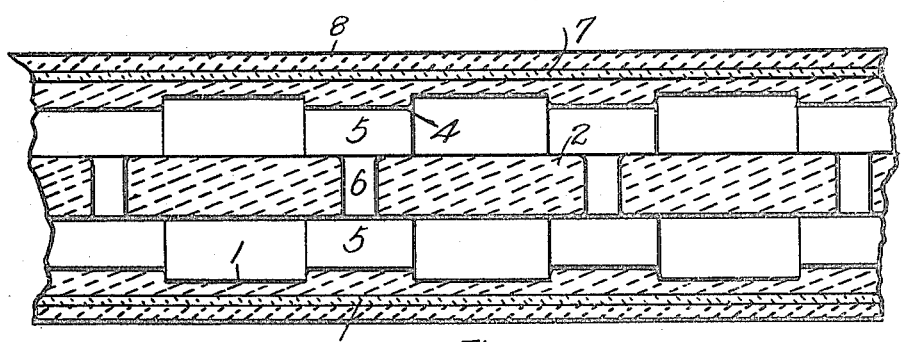
FIG.3.  ISAAC NORMANDY.

UNITED STATES PATENT OFFICE.

ISAAC NORMANDY, OF ST. CATHARINES, ONTARIO, CANADA.

AUTOMOBILE-TIRE.

1,231,931.  Specification of Letters Patent.  Patented July 3, 1917.

Application filed October 5, 1916. Serial No. 123,909.

*To all whom it may concern:*

Be it known that I, ISAAC NORMANDY, of the city of St. Catharines, in the county of Lincoln, in the Province of Ontario, Canada, have invented certain new and useful Improvements in Automobile-Tires, of which the following is the specification.

My invention relates to improvements in automobile tires and the object of the invention is to devise a simple cushioned tire which will be non-pneumatic and which will dispense with the side plates necessary for taking up lateral strain and yet be capable of taking up such strain and it consists essentially of the following arrangement and construction of parts as hereinafter more particularly explained by the following specification.

Figure 1, is a sectional view through my tire.

Fig. 2, is a longitudinal section through a portion of the tire taken on line x—y Fig. 1 on a slightly reduced scale.

Fig. 3, is a sectional plan view on line x'—y' Fig. 1 and on the same scale as Fig. 2.

In the drawings like letters of reference indicate corresponding parts in each figure.

1 indicates an inner tubular portion, the wall of which gradually increases in thickness toward the outer periphery or tread of the tire. 2 indicates a vertical web extending diametrically of the inner tubular portion and parallel with the vertical planes of the side walls of the tire, such web gradually merging into the interior face of the inner tubular portion at the top and bottom. 4 indicates a series of ribs formed in the interior of the inner tubular portion and spaced at suitable distances apart, the inner faces of such ribs extending substantially parallel with the inner face of the inner tubular portion, the upper and lower portions of such ribs extending inwardly in curved form and downward and upward to gradually merge into the outer faces of the web 2 in proximity to its center thereby forming substantially oval-shaped openings 5 in each rib 4. 6 indicate orifices extending through the web 2 at suitable distances apart. 7 indicates an outer covering of canvas. 8 indicates an outer casing of rubber formed at its interior periphery with a clencher portion 9 having an outer covering of canvas 10. It will thus be seen that the web 2 forms a resilient compressible member which takes the place of air in the ordinary pneumatic tire, such web being reinforced laterally by the ribs 4, the interior portions of the ribs gradually merging up into the web so as to reinforce the side of the web against lateral play. The orifices 6 are formed for the purpose of equalizing the air pressure on each side of the web 2.

From this description it will be seen that I have devised a very simple form of tire which will take the place of an ordinary pneumatic tire used for automobile purposes, which will be strong and resilient, which will not be affected by puncture and which will readily take up any lateral strain brought upon the tire during skidding or passing around a curve.

What I claim as my invention is.

1. In an automobile tire, an inner tubular member provided with a web extending vertically diametrically across the interior of the tubular member and merging gradually at the top and bottom into the interior face of the wall of such tubular member, and a series of ribs formed in the interior face of the inner tubular member and gradually merging at the top and bottom into the central web.

2. In an automobile tire, an inner tubular member provided with a web extending vertically diametrically across the interior of the tubular member and merging gradually at the top and bottom into the interior face of the wall of such tubular member, and a series of ribs formed in the interior face of the inner tubular member and having inwardly curved top and bottom portions merging gradually into the central web of the tire.

3. In an automobile tire, a tubular member having interior ribs extending transversely and spaced at suitable distances apart, and a structure located centrally of the tubular member and into which the ribs merge.

4. In an automobile tire, a tubular member having ribs extending transversely and spaced at suitable distances apart, and compression resistance means extending vertically and diametrically of the tire and into which the ribs merge.

ISAAC NORMANDY.

Witnesses:
M. EGAN,
G. LUGLY.

Copies of this patent may be obtained for five cents each, by addressing the "Commissioner of Patents, Washington, D. C."